March 13, 1934.   L. WOODWARD   1,951,228
COMBINATION BOLT AND CLINCH PIN
Filed May 17, 1930
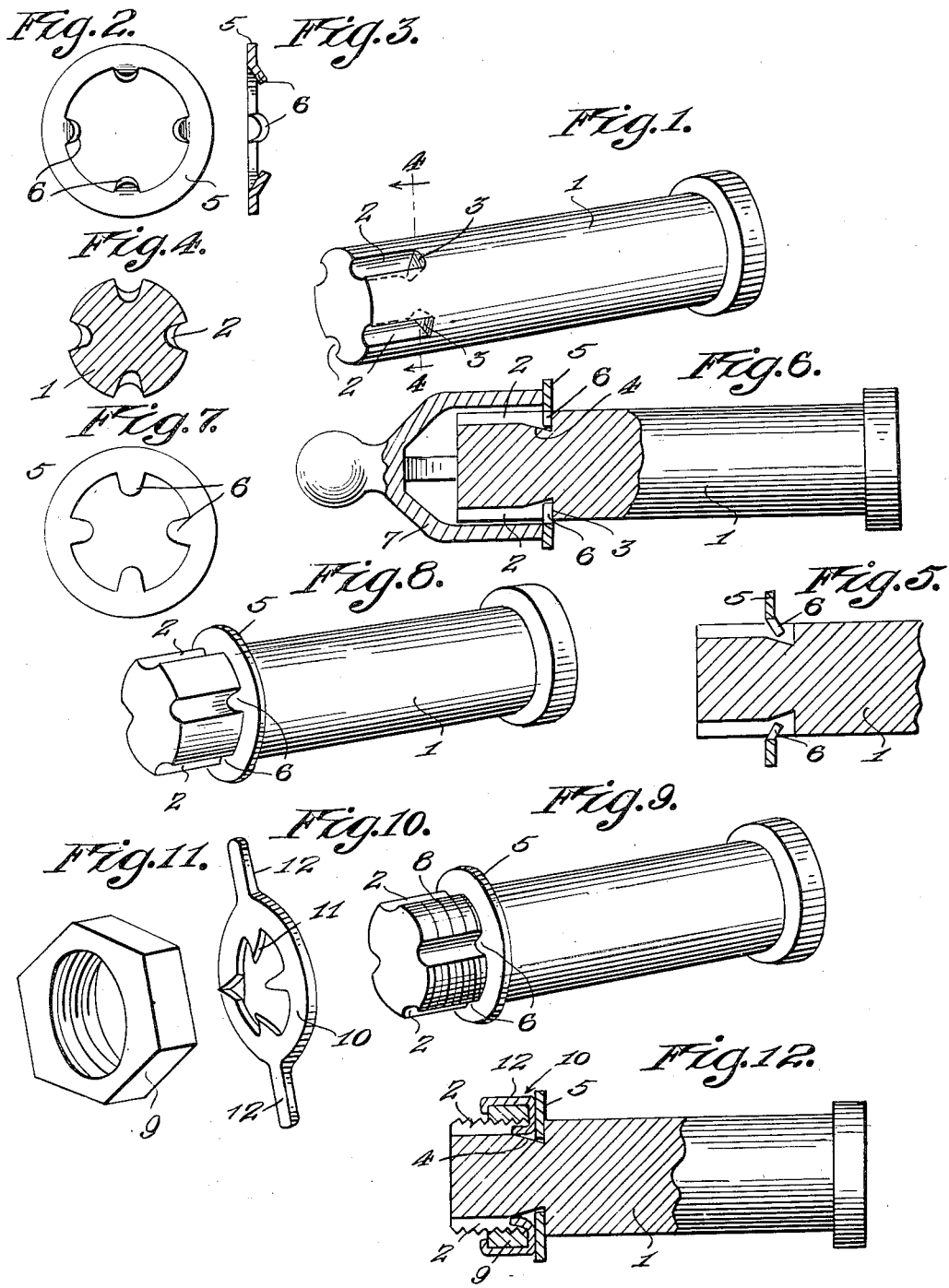

Patented Mar. 13, 1934

1,951,228

UNITED STATES PATENT OFFICE 1,951,228

COMBINATION BOLT AND CLINCH PIN

Lavater Woodward, Liberty, Tenn.

Application May 17, 1930, Serial No. 453,313

1 Claim. (Cl. 151—28)

This invention relates to a combination bolt and clinch pin, the general object of the invention being to provide means whereby a washer can be so fastened thereto by forcing tongues on the washer into recesses in the pin, that the pin will be fastened in a part or parts through which it passes.

Another object of the invention is to provide means whereby a nut can be placed on the threaded part of the bolt or pin and fastened thereto by a lock washer.

This invention also consists in certain other features of construction and in the combination and arrangement of the several parts, to be hereinafter fully described, illustrated in the accompanying drawing and specifically pointed out in the appended claim.

In describing the invention in detail, reference will be had to the accompanying drawing wherein like characters denote like or corresponding parts throughout the several views, and in which:—

Figure 1 is a perspective view of the pin forming a part of the invention.

Figure 2 is a view of the washer which is adapted to be fastened to the pin.

Figure 3 is a sectional view through said washer.

Figure 4 is a section on line 4—4 of Figure 1.

Figure 5 is a sectional view showing the washer on the pin.

Figure 6 is a view showing how the tongues on the washer are straightened to engage the recesses in the pin by a punch.

Figure 7 is a view of the washer with the tongues in a straight position.

Figure 8 is a perspective view showing the washer fastened to the pin.

Figure 9 is a view showing the washer and bolt, with the bolt provided with the threaded end for receiving the nut.

Figure 10 is a view of the lock washer for the nut.

Figure 11 is a view of the nut.

Figure 12 is a view of the parts assembled.

In these views, the numeral 1 indicates the pin or bolt and the numeral 2 indicates short grooves formed in the end of the pin, these grooves terminating in flat shoulders 3 at their inner ends, with a recess 4 formed in the bottom part of the inner end of each groove, the shoulder 3 forming one wall of the recess. A washer 5, having the bent tongues 6 on its inner periphery, is adapted to be placed over the pin with the tongues engaging the grooves. The tongues are so bent that they will rest against the shoulders 3, with the washer spaced from the shoulders and then by placing a punch, such as shown at 7 in Figure 6, on the washer and striking the punch a blow, the tongues will be straightened so that they will enter the recesses 4 and thus the washer will be fastened to the pin. This washed will serve to hold the pin in place in a member or a number of members, where the strain is not too great, but if the strain is too great, then the grooved end of the pin or bolt may be threaded, as shown at 8 in Figures 9 and 12, so that a nut 9 can be threaded thereon. In this case, a lock washer 10 is placed on the threaded end of the bolt, with its interior tongues 11 engaging the recesses 4 and after the bolt has been threaded home, the exterior tongues 12 on the washer 10 are bent over the nut, as shown in Figure 12, so as to lock the nut against movement. Thus I have provided simple means for holding a bolt or pin in position without danger of it working loose.

It is thought from the foregoing description that the advantages and novel features of the invention will be readily apparent.

It is to be understood that changes may be made in the construction and in the combination and arrangement of the several parts, provided that such changes fall within the scope of the appended claim.

What I claim is:—

The combination of a pin of circular formation having opposed longitudinal grooves provided with inwardly beveled relatively deep portions at their inner ends, said pin further having abutments confronting the deep portions of the grooves, a locking washer slidable over the pin and having yieldable angularly disposed tongues for traversing the grooves, the tongues being adapated for engagement with the abutments to be straightened into the deep portions of the grooves, and a nut engageable upon the pin for the straightening of the tongues and locked with the said washer.

LAVATER WOODWARD.